US009385393B2

(12) United States Patent
Jin

(10) Patent No.: US 9,385,393 B2
(45) Date of Patent: Jul. 5, 2016

(54) VOLTAGE MONITORING DEVICE OF STACK

(71) Applicant: Hyundai Motor Company, Seoul (KR)

(72) Inventor: Sang Mun Jin, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 24 days.

(21) Appl. No.: 14/469,164

(22) Filed: Aug. 26, 2014

(65) Prior Publication Data

US 2015/0180077 A1  Jun. 25, 2015

(30) Foreign Application Priority Data

Dec. 24, 2013 (KR) .................. 10-2013-0162859

(51) Int. Cl.
*H01M 8/24* (2006.01)
*H01M 8/04* (2006.01)

(52) U.S. Cl.
CPC ........ *H01M 8/2465* (2013.01); *H01M 8/04559* (2013.01); *Y02E 60/50* (2013.01)

(58) Field of Classification Search
None
See application file for complete search history.

(56) References Cited

U.S. PATENT DOCUMENTS

| | | | | |
|---|---|---|---|---|
| 6,844,093 B2 * | 1/2005 | Kikuchi | ................ | H01M 8/02 429/432 |
| 7,220,511 B2 * | 5/2007 | Nakagawa | .......... | H01M 8/0247 429/432 |
| 2003/0215678 A1 * | 11/2003 | Barton | ................ | H01M 8/0206 429/465 |
| 2005/0191537 A1 * | 9/2005 | Belchuk | .............. | H01M 8/0273 429/428 |
| 2005/0213409 A1 * | 9/2005 | Wakahoi | .............. | H01M 8/0247 365/222 |
| 2006/0035132 A1 * | 2/2006 | Ariyoshi | ............. | H01M 8/0247 429/468 |
| 2013/0316560 A1 * | 11/2013 | Yoon | ..................... | H01R 13/62 439/345 |

FOREIGN PATENT DOCUMENTS

| | | | | |
|---|---|---|---|---|
| JP | WO 2011148433 A1 * | 12/2011 | ......... | H01M 8/0297 |
| JP | WO 2012043486 A1 * | 4/2012 | ......... | H01R 13/6315 |
| KR | 2007-0075281 A | 7/2007 | | |
| KR | 2009-0006553 A | 1/2009 | | |
| KR | 2011-0137269 A | 12/2011 | | |
| KR | 10-2012-0050132 A | 5/2012 | | |
| KR | 10-2012-0085537 A | 8/2012 | | |

(Continued)

OTHER PUBLICATIONS

Korean Office Action issued in Korean Application No. 10-2013-0162859, dated Dec. 19, 2014.

(Continued)

*Primary Examiner* — Gregg Cantelmo
(74) *Attorney, Agent, or Firm* — McDermott Will & Emery LLP

(57) ABSTRACT

A device for measuring stack voltage includes a stack part and a connector. The stack part includes terminals of a bipolar plate extending outward from a side of the bipolar plate, a gasket combined with the bipolar plate, a sub-gasket combined with the gasket and having extensions laterally protruding corresponding to the terminals. The connector has insertion grooves in which the terminals are disposed at a front of the connector. A plurality of wires pass forward from behind through the connector. The connector has sensing units that are disposed in the insertion grooves, connected to front ends of the wires, and are in contact with the terminals of the bipolar plate when the connector is combined with the stack part.

9 Claims, 5 Drawing Sheets

(56) References Cited

FOREIGN PATENT DOCUMENTS

| KR | 2013-0076119 A | 7/2013 |
|---|---|---|
| KR | 10-2013-0123911 A | 11/2013 |

OTHER PUBLICATIONS

Korean Notice of Allowance issued in Korean Application No. 10-2013-0162859 dated Jul. 31, 2015.

* cited by examiner

VOLTAGE MONITORING DEVICE OF STACK

CROSS-REFERENCE(S) TO RELATED APPLICATION

The present application claims benefit of priority to Korean Patent Application Number 10-2013-0162859 filed on Dec. 24, 2013, the entire content of which is incorporated herein by reference.

TECHNICAL FIELD

The present inventive concept relates to a device for measuring stack voltage which can measure the voltage of each of unit cells through a bipolar plate of a fuel cell stack.

BACKGROUND

Fuel cells, the main power suppliers of fuel cell systems, are devices that produce electric energy and water from a chemical reaction of oxygen in the air and hydrogen as fuel.

Hydrogen as the fuel of fuel cell systems is supplied to the anode of the fuel cell from a fuel tank and the air in the atmosphere is supplied directly to the cathode of a fuel cell stack by an air supplier.

The hydrogen supplied to the fuel cell stack is separated into hydrogen ions and electrons, the separated hydrogen ions flow to the cathode through an electrolyte membrane, and the oxygen supplied to the cathode produces water and generates electric energy by bonding with the electrons flowing into the cathode through an external conducting wire.

The fuel cell stack is formed by stacking in series unit cells generating voltage of around 1V in accordance with operation conditions, and when even one of the cells fails to achieve its normal performance, it causes output reduction of the entire stack. Accordingly, it is determined whether there is a problem by measuring the voltage of the unit cells while the fuel cell stack operates, with a voltage measuring device in contact with a portion of a bipolar plate.

The voltage measuring device includes sensing units that measure voltage, and a terminal guide is disposed between the sensing units, and thus prevents a short-circuit between the sensing units, and allows the terminal of the bipolar plate and the sensing units to be uniformly inserted when the voltage measuring device is combined with the bipolar plate.

Recently, however, the opening direction of fuel cells is set in a way of reducing the cell pitch and the thickness of the material for the bipolar plate in order to improve the power density of stacks.

Although the thickness of the terminal guide in the voltage measuring device is supposed to be reduced as much as the cell pitch is reduced, at present, there is a technical limitation on reducing the thickness of the terminal guide.

Further, the bending resistance rapidly decreases with the reduction of the thickness of the bipolar plate, so it is more difficult to keep the gap between the terminals of the bipolar plate constant and the terminals of the bipolar plate are damaged by external force when the voltage measuring device is combined.

Therefore, there is a need for a technology that can keep the gap between the terminals of a bipolar plate constant even if the cell pitch and the thickness of the bipolar plate are decreased and that prevents the terminals of the bipolar plate from easily deforming due to external force or shock when a voltage measuring device is combined.

The description provided above as a related art of the present inventive concept is just for helping in understanding the background of the present inventive concept and should not be construed as being included in the related art known by those skilled in the art.

SUMMARY

The present inventive concept has been made in an effort to provide a device for measuring stack voltage which can keep the gap between terminals of a bipolar plate constant and prevent the terminals of the bipolar plate from easily deforming due to external force.

One aspect of the present inventive concept relates to a device for measuring stack voltage includes a stack part and a connector. The stack part includes terminals of a bipolar plate extending laterally from a side of the bipolar plate, a gasket combined with the bipolar plate, a sub-gasket combined with the gasket and having extensions laterally protruding corresponding to the terminals. The connector has insertion grooves in which the terminals are disposed at a front of the connector. A plurality of wires pass forward from behind through the connector. The connector has sensing units that are disposed in the insertion grooves, connected to front ends of the wires, and are in contact with the terminals of the bipolar plate when the connector is combined with the stack part.

The terminals of the bipolar plate may laterally protrude with identical intervals and the extensions of the sub-gasket may protrude to be disposed in gaps between the terminals, respectively, such that the extensions may be positioned between the sensing units of the connector when the stack part and the connector are combined.

The extensions of the stack part may reach ends of the insertion grooves of the connector when the stack part and the connector are combined.

The extensions of the sub-gasket of the stack part may be tapered at ends thereof protruding laterally.

Protectors laterally protruding and surrounding the terminals of the bipolar plate may be disposed on the gasket of the stack part.

A holding groove may be defined on the protectors of the stack part and the connector may have rotatable covers on both sides, such that when the covers rotate with the connector and the stack part as combined, the covers may be retained in the holding grooves of the protectors.

The covers of the connector may have a solid plate shape and cover the insertion grooves of the connector when the covers are disposed in the holding grooves of the protectors.

According to the device for measuring stack voltage with the structure as described above, it is possible to keep the gap between the terminals of the bipolar plate constant and prevent the terminals from easily deforming due to external force.

That is, the gaps between terminals of the bipolar plate can be kept constant and damage to the terminals due to external force or shock can be prevented by the protectors and the extensions of the gasket and the sub-gasket.

Further, terminal guides that were used in the existing voltage measuring devices are not provided and the extensions of the sub-gasket function as the terminal guides, so it is possible to prevent the terminals from being deformed by the existing terminal guides when the connector is coupled to the terminals of the bipolar plate.

Further, since the connector is fixed to the stack part without separating by the covers after combined with the stack part, the fastening force between the connector and the stack part can be improved.

BRIEF DESCRIPTION OF THE DRAWINGS

The above and other features of the present inventive concept will now be described in detail with reference to certain exemplary embodiments thereof illustrating the accompanying drawings which are given hereinbelow by way of illustration only, and thus are not limitative of the present inventive concept.

Figure 1:
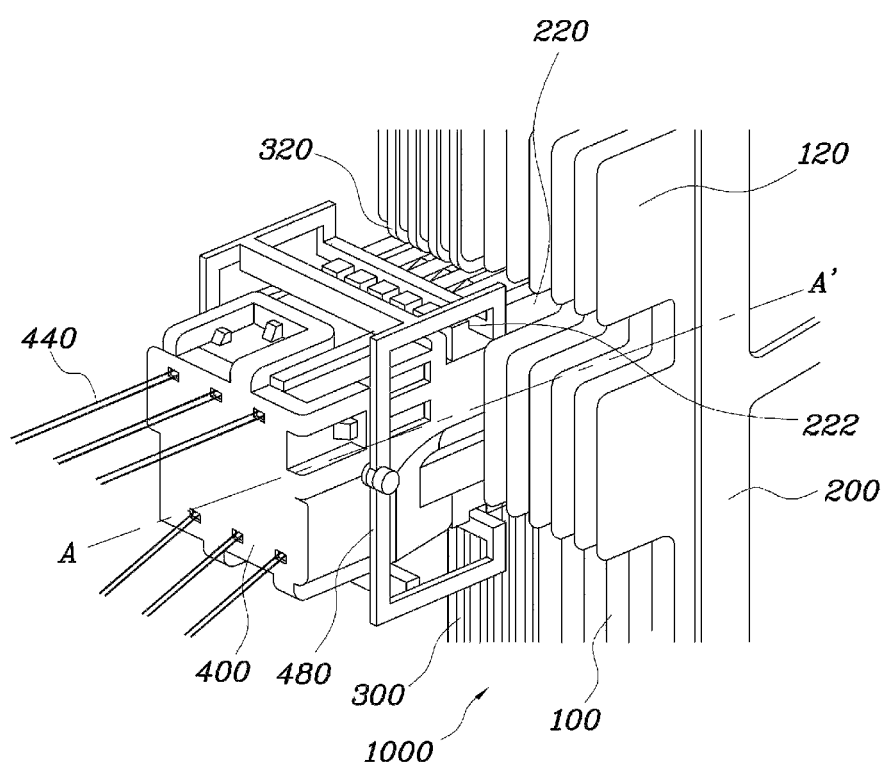
FIG. 1 is a perspective view showing a device for measuring stack voltage according to an embodiment of the present inventive concept.

It should be understood that the appended drawings are not necessarily to scale, presenting a somewhat simplified representation of various preferred features of the present inventive concept as disclosed herein, including, for example, specific dimensions, orientations, locations, and shapes will be determined in part by the particular intended application and use environment.

In the figures, reference numbers refer to the same or equivalent parts of the present inventive concept throughout the several figures of the drawing.

DETAILED DESCRIPTION

A device for measuring stack voltage according to exemplary embodiments of the present inventive concept is described hereafter with reference to the accompanying drawings.

Figure 2:
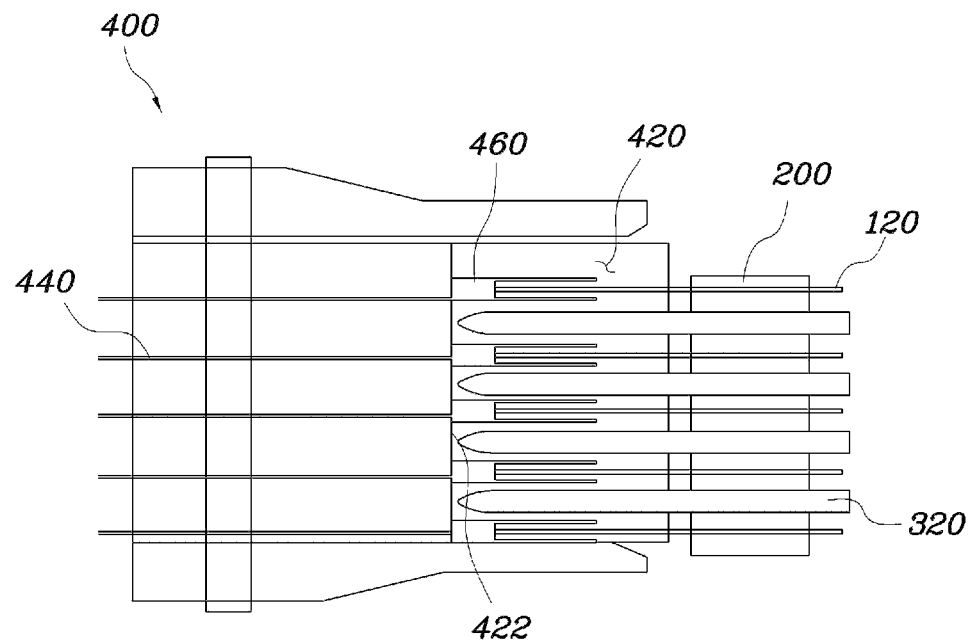
FIG. 2 is a cross-sectional view taken along line A-A' from the device for measuring stack voltage shown in FIG. 1.
Figure 3:
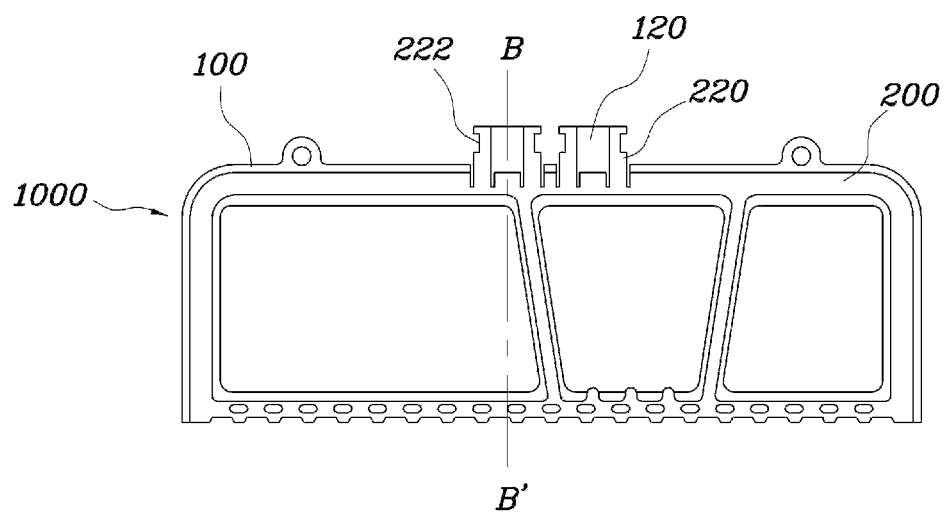
FIG. 3 is a view showing a gasket of the device for measuring stack voltage shown in FIG. 1.
Figure 4:
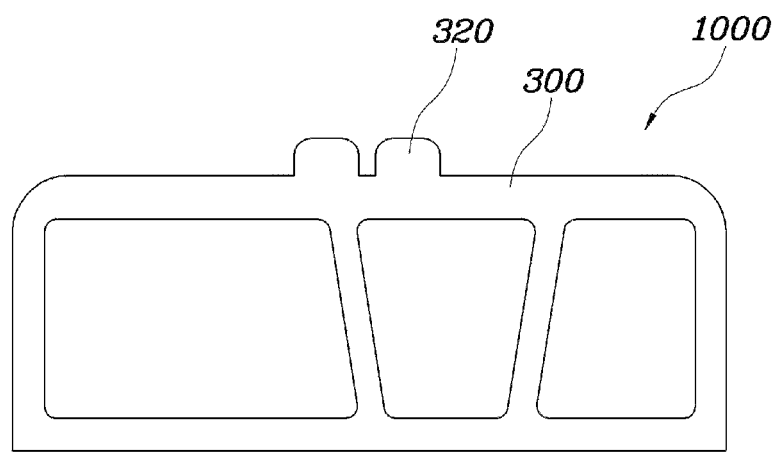
FIG. 4 is a view showing a sub-gasket of the device for measuring stack voltage shown in FIG. 1.
Figure 5:
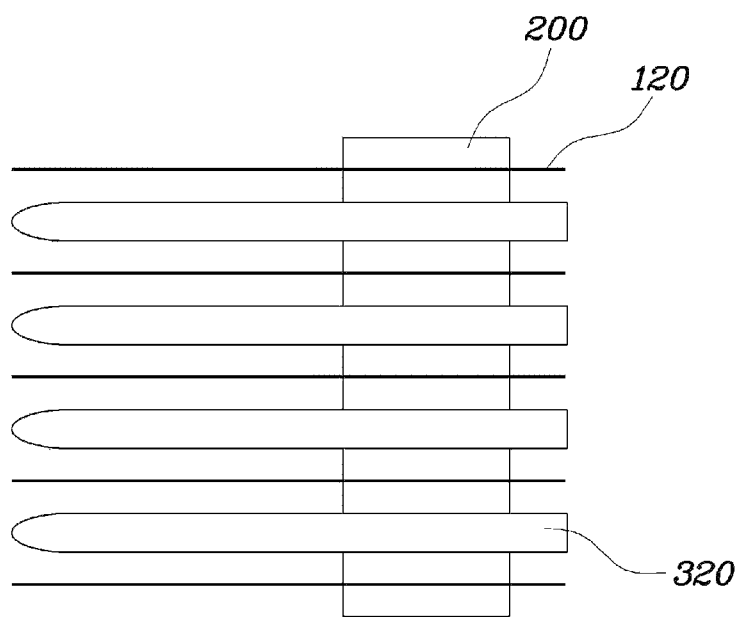
FIG. 5 is a cross-sectional view taken along line B-B' from the device for measuring stack voltage shown in FIG. 3.
Figure 6:
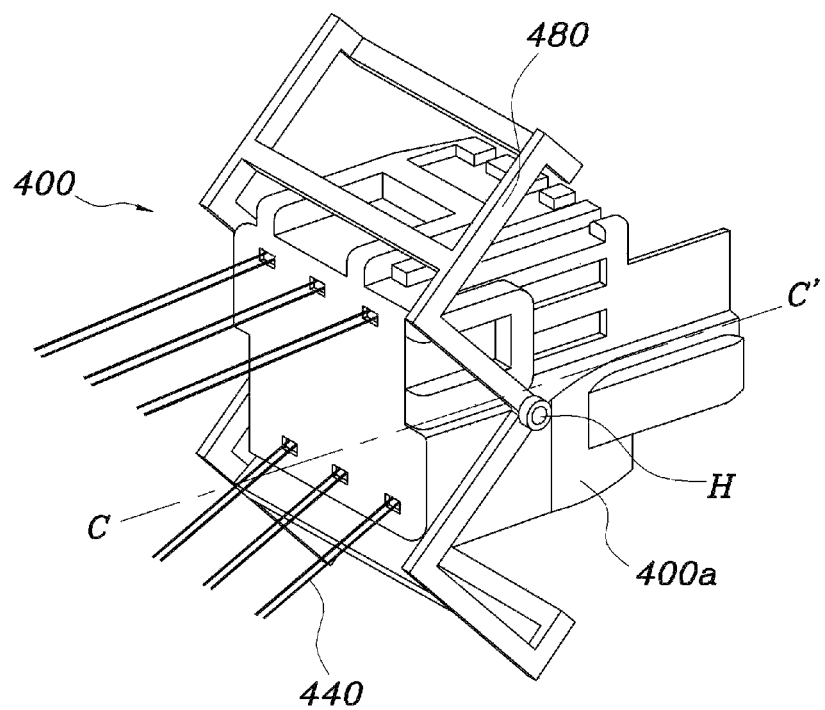
FIG. 6 is a view showing a connector of the device for measuring stack voltage shown in FIG. 1.
Figure 7:
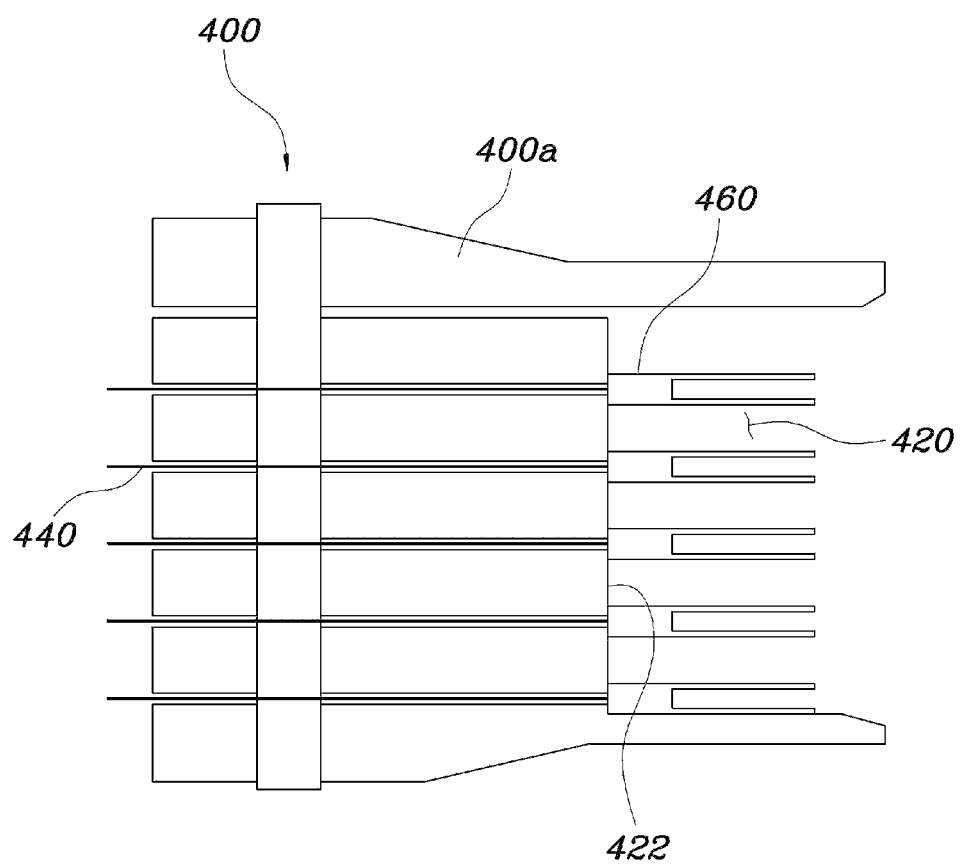
FIG. 7 is a cross-sectional view taken along line C-C' from the device for measuring stack voltage shown in FIG. 6.

FIG. 1 is a perspective view showing a device for measuring stack voltage according to an embodiment of the present inventive concept and FIG. 2 is a cross-sectional view taken along line A-A' from the device for measuring stack voltage shown in FIG. 1. FIG. 3 is a view showing a gasket of the device for measuring stack voltage shown in FIG. 1, FIG. 4 is a view showing a sub-gasket of the device for measuring stack voltage shown in FIG. 1, and FIG. 5 is a cross-sectional view taken along line B-B' from the device for measuring stack voltage shown in FIG. 3. FIG. 6 is a view showing a connector of the device for measuring stack voltage shown in FIG. 1 and FIG. 7 is a cross-sectional view taken along line C-C' from the device for measuring stack voltage shown in FIG. 6.

In general, fuel cell stacks may include a plurality of Membrane Electrode Assembly (MEAs), a bipolar plate having a gas diffuser, an air supplier, and a cooling water channel for flow of cooling water disposed at a side of the MEAs and, and a gasket for maintaining tightness against cooling water and fastening pressure at an appropriate level. Further, the fuel cell stacks may include a sub-gasket that protects the MEAs and enables a fuel cell stack to be assembled, and thereby the fuel cell stack may be formed.

Referring to FIG. 1, a device for measuring stack voltage according to the present inventive concept may include a stack part 1000, a gasket 200, a sub-gasket 300, and a connector 400. The stack part 1000 may include terminals 120 extending outward from a side of a bipolar plate 100. The gasket 200 may be combined with the bipolar plate 100. The sub-gasket 300 may be combined with the gasket 200 and have extensions 320 laterally protruding so as to correspond to the terminals 120. The connector 400 may have insertion grooves 420 in which the terminals 120 are inserted at the front of the connector 400, through which a plurality of wires 440 passes forward from behind, and in which sensing units 460 are disposed in the insertion grooves 420 (see FIG. 2), connected to the front ends of the wires 440, and are brought in contact with the terminals 120 of the bipolar plate 100 when the connector 400 is combined with the stack part 1000.

As shown in FIGS. 1 and 2, according to an embodiment of the present inventive concept, the terminals 120 of the bipolar plate 100 may keep a predetermined gap and may be prevented from easily deforming due to external force.

To this end, the stack part 1000 according to an embodiment of the present inventive concept can be largely divided into the bipolar plate 100, the gasket 200, and the sub-gasket 300. The terminals 120 for measuring the voltage of cells may laterally protrude from the bipolar plate 100, and the terminals 120 may be protected from external shock by the gasket 200, protectors 220 and extensions 320. The gasket 200 may be combined with the bipolar plate 100, and the extensions 320 may protrude from the sub-gasket 300 combined with the gasket 200. The protectors 220 of the gasket 200 and the extensions 320 of the sub-gasket 300 are described again in detail below.

The connector 400 according to an embodiment of the present inventive concept may be electrically connected to the terminals 120 on the bipolar plate 100 of the stack part 1000 and may measure the voltage of the cells through the terminals 120. The connector 400 according to an embodiment of the present inventive concept may have the insertion grooves 420 at the front in which the terminals 120 of the bipolar plate 100 are inserted. The wires 440 may pass through the connector 400 forward from behind, and the sensing units 460 disposed in the insertion grooves 420 may be connected to the front ends of the wires 440. The sensing units 460 of the connector 400 may measure the voltage of the cells when they are brought in contact with and electrically connected with the terminals 120 of the bipolar plate 100. The wires 440 may be connected to the sensing units 460 so as to transmit the measured voltage values.

Since the connector 400 according to an embodiment of the present inventive concept has no terminal guide that the existing voltage measuring devices have, unlike the related art, it is possible to prevent terminals of a bipolar plate from being damaged when a stack part is combined. Since the connector 400 has no terminal guide, as described above, and the extensions 320 laterally protruding from the sub-gasket 300 may function as the terminal guides which are not provided in this configuration, the sensing units 440 of the connector 400 can be uniformly in contact with the terminals 120 of the bipolar plate 100, when the connector 400 and the stack part 1000 are combined.

In detail, as shown in FIG. 2, the terminals 120 of the bipolar plate 100 may laterally protrude with regular intervals and the extensions 320 of the sub-gasket 300 may protrude to be inserted into the gaps between the terminals 120, so that the extension 320 can be positioned between the sensing units 460 of the connector 400, when the stack part 1000 and the connector 400 are combined.

The terminals 120 of the bipolar plate 100 may laterally protrude with regular intervals and may be brought in contact with and electrically connected with the sensing units 460 in the insertion groove 420 when the connector 400 is combined with the stack part 1000, so they allow for measurement of voltage of the cells.

The sensing units 460 of the connector 400 may be also arranged with regular intervals identical to the intervals between the terminals 120 of the bipolar plate 100, but the sensing units 460 may be short-circuited by electricity flowing between the sensing units 460 when the sensing units 460 and the terminals 120 of the bipolar plate 100 are electrically connected.

Accordingly, since the extensions 320 of the sub-gasket 300 protrude to be inserted into the gaps between the terminals 120, the extensions 320 may be positioned between the sensing units 460 when the connector 400 is combined with the stack part 1000, so it is possible to prevent a short-circuit between the sensing units 460.

To this end, the extensions 320 of the sub-gasket 300 of the stack part 1000 may protrude to reach the ends 422 (see FIG. 2) of the insertion grooves 420 of the connector 400 when the stack part 1000 and the connector 400 are combined. As the extensions 320 of the sub-gasket 300 are extended to reach the ends 422 of the insertion grooves 420 of the connector 400 when the stack part 1000 and the connector 400 are combined, it is possible to prevent a short-circuit between the sensing unit 460.

Further, the extensions 320 on the sub-gasket 300 of the stack part 1000 may be tapered at the ends protruding laterally.

Since the protruding ends of the extensions 320 of the sub-gasket 300 are tapered to be pointed, the extensions 320 of the sub-gasket 300 can be uniformly inserted in between the sensing units 460 of the connector 400 when the connector 400 is combined with the stack part 1000, so the non-uniform gaps between the sensing units 460 can be corrected.

As shown in FIG. 3, the protectors 220 laterally protruding to surround the terminals 120 of the bipolar plate 100, respectively, may be formed on the gasket 200 of the stack part 1000.

The protectors 220 may protect the terminals 120 from external shock by protruding toward the terminals 120 of the bipolar plate 100 from the gasket 200 and surrounding the terminals 120. The protectors 220 of the gasket 200 can protect the terminals 120 of the bipolar plate 100 from external force or shock, together with the extensions 320 of the sub-gasket 300 described above, and keep the gaps between the terminals 120 of the bipolar plate 100 constant, and accordingly, the protectors 220 can allow the connector 400 to be more easily mounted.

The protectors 220 of the gasket 200 can protect the terminals 120 of the bipolar plate 100 from external shock and can improve the fastening force when the connector 400 is combined with the stack part 1000.

Referring to FIG. 3, a holding groove 222 may be formed on the protectors 220 of the stack part 1000 and the connector 400 may have rotatable covers 480 (see FIG. 1) on both sides, so that when the covers 480 rotate with the connector 400 and the stack part 1000 as combined, the covers 480 can be retained in the holding grooves 222 of the protectors 220.

The protectors 220 of the gasket 200 may be, as shown in FIGS. 1 to 3, formed to be exposed around the terminals 120 of the bipolar plate 100 and the holding grooves 222 where the cover 480 of the connector 400 can be inserted and retained may be formed on the protectors 220.

The connector 400 may include the sensing units 460 that sense voltage in contact with the terminals 120 of the bipolar plate 100, the wires 440 connected to the sensing units 460, and a housing 400a structurally supporting the sensing units 460 and the wires 440. The covers 480 may be rotatably coupled in a hinge structure H to both sides of the housing 400a and can be inserted in the holding grooves 222 of the protector 220 when rotating with the connector 400 and the stack part 1000 combined.

Accordingly, the connector 400 can be firmly fixed to the stack part 1000 without shaking by combining the connector 400 with the stack part 1000 and then inserting the covers 480 of the connector 400 into the holding grooves 222 of the protectors 220 by rotating the covers 480, so the reliability of the measured data can also be improved.

The covers 480 of the connector 400 may be formed into a solid plate shape and the covers 480 can cover the insertion grooves 420 of the connector 400 when they are inserted in the holding grooves 222 of the protectors 220.

The covers 480 of the connector 400 may be formed like frames to reduce the manufacturing cost, but the side around the connector 400 may be formed with one side so that the inner and outer portions of the connectors 400 are closed when the covers 480 are inserted in the holding grooves 222 of the protector 200, so that foreign substances such as dust are prevented from flowing into the sensing units 460 of the connector 400 and the reliability of the measured data can be improved accordingly.

According to the device for measuring stack voltage with the structure as described above, it is possible to keep the gaps between the terminals of the bipolar plate constant and prevent the terminals from easily deforming due to external force.

That is, the gaps between terminals of the bipolar plate can be kept constant and damage to the terminals due to external force or shock can be prevented by the protectors and the extensions of the gasket and the sub-gasket.

Further, the problem due to reducing the cell pitch is solved by removing terminal guides that were used in the existing voltage measuring devices and instead using the extensions of the sub-gasket function as the existing terminal guides, so it is possible to prevent the terminals from being deformed by terminal guides when the connector is coupled to the terminals of the bipolar plate.

Further, since the connector is fixed to the stack part without separating by the covers after combined with the stack part, the fastening force between the connector and the stack part can be improved.

Although the present inventive concept was described with reference to specific embodiments shown in the drawings, it is apparent to those skilled in the art that the present inventive concept may be changed and modified in various ways without departing from the scope of the present inventive concept, which is described in the following claims.

What is claimed is:

1. A device for measuring stack voltage, comprising:
a stack part including terminals of a bipolar plate extending outward from a side of the bipolar plate, a gasket combined with the bipolar plate, a sub-gasket combined with the gasket and having extensions laterally protruding corresponding to the terminals; and
a connector having insertion grooves in which the terminals are disposed at a front of the connector, a plurality of wires passing forward from behind through the connector, the connector having sensing units that are disposed in the insertion grooves, connected to front ends of the wires, and are in contact with the terminals of the bipolar plate when the connector is combined with the stack part,
wherein protectors laterally protruding and surrounding the terminals of the bipolar plate are disposed on the gasket of the stack part, a holding groove is defined on the protectors of the stack part, and the connector has rotatable covers on both sides, such that when the covers rotate with the connector and the stack part as combined, the covers are disposed and retained in the holding grooves of the protectors.

2. The device of claim 1, wherein the terminals of the bipolar plate laterally protrude with identical intervals and the extensions of the sub-gasket protrude to be disposed in gaps between the terminals, respectively, such that the extensions are positioned between the sensing units of the connector when the stack part and the connector are combined.

3. The device of claim 1, wherein the extensions of the stack part reach ends of the insertion grooves of the connector when the stack part and the connector are combined.

4. The device of claim 1, wherein the extensions of the sub-gasket of the stack part are tapered at ends thereof protruding laterally.

5. The device of claim 1, wherein the covers of the connector have a solid plate shape and cover the insertion grooves of the connector when the covers are disposed in the holding grooves of the protectors.

6. A device for measuring stack voltage, comprising:

a stack part including terminals of a bipolar plate extending outward from a side of the bipolar plate, a gasket combined with the bipolar plate, a sub-gasket combined with the gasket and having extensions laterally protruding corresponding to the terminals;

a connector including rotatable covers, insertion grooves and a plurality of sensing units disposed in the insertion grooves, wherein:

the terminals being disposed at a front of the connector, and the covers are retained in holding grooves of the stack part when the covers rotate with the connector and the stack part as combined.

7. The device of claim 6, wherein the covers are coupled in a hinge structure to both sides of the connector.

8. The device of claim 6, wherein the covers cover the insertion grooves of the connector when the covers are retained in holding grooves of the stack part.

9. The device of claim 6, wherein inner and outer portions of the connector are closed when the covers are retained in holding grooves of the stack part.

* * * * *